Sept. 10, 1968     H. H. FR. AHRENS     3,400,969
COVER ARRANGEMENT FOR THE OUTER PANELING OF LARGE-SPACE
VEHICLES, ESPECIALLY BUSES
Filed Dec. 5, 1966
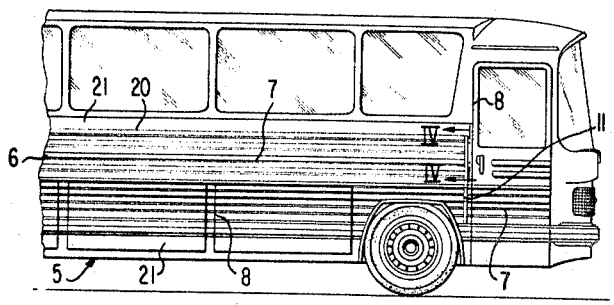
FIG. I
FIG. 2
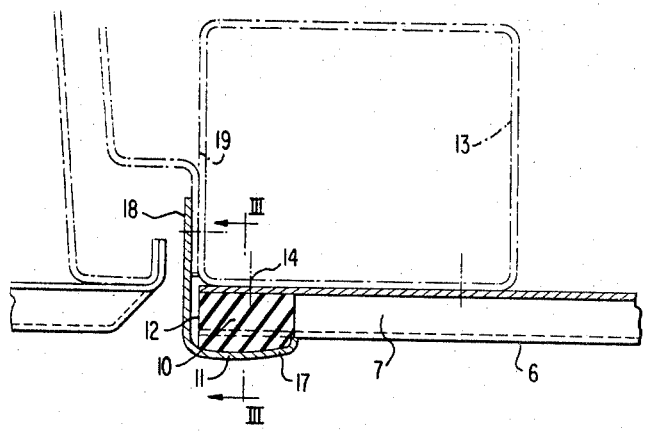
FIG. 3
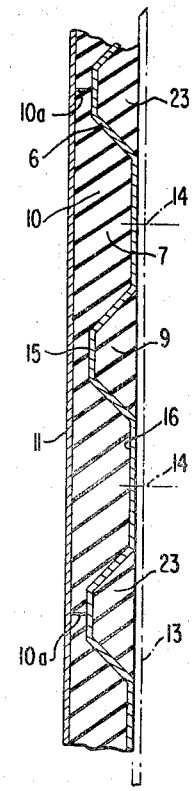
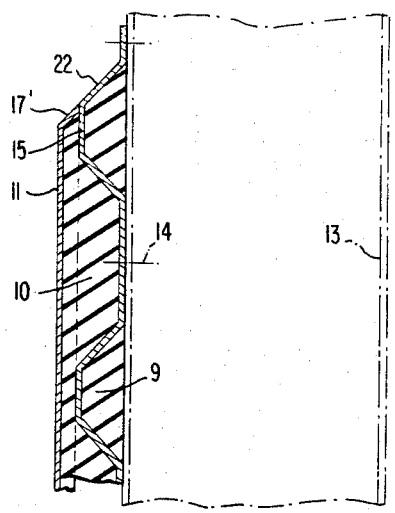
FIG. 4
INVENTOR
HERMANN H. FR. AHRENS
BY
ATTORNEYS United States Patent Office 3,400,969
Patented Sept. 10, 1968

3,400,969
COVER ARRANGEMENT FOR THE OUTER PANELING OF LARGE-SPACE VEHICLES, ESPECIALLY BUSES
Hermann H. Fr. Ahrens, Stuttgart-Vaihingen, Germany, assignor to Daimler-Benz Aktiengesellschaft, Stuttgart-Unterturkheim, Germany
Filed Dec. 5, 1966, Ser. No. 599,012
Claims priority, application Germany, Dec. 7, 1965, D 48,846
11 Claims. (Cl. 296—28)

ABSTRACT OF THE DISCLOSURE

An outer cover structure for covering the exposed edges of profiled outer panels, as occur in the door openings, luggage space openings, etc., of large-space vehicles, especially buses, whereby, within the area of the exposed edges, plugs are inserted into the hollow interior spaces of the profiled panels, a strip or strips of substantially complementary shape are placed over the profiled outer panels and an outer sheet metal strip having two angular disposed legs is placed with one leg over the first-mentioned strip in a plane parallel to the plane of the outer panel while the other leg extends approximately transversely over the exposed edge and is secured at a fixed part of the vehicle. The plugs as well as the strip material placed over the outer surface of the profiled panel may be made from oil and water impermeable, temperature-resistant, and elastically yielding synthetic plastic resin material.

Background of the invention

The present invention relates to a cover arrangement for the exposed end edges of profiled outer panels of large-space vehicles, especially buses and aims at covering the exposed edges optically completely satisfactorily, at avoiding injury to persons or damage to articles by sharp edges and to protect the hollow spaces of the paneling against penetration of water, moisture, aggressive gases, dust or other foreign bodies.

With the vehicle bodies of modern, large space vehicles, the walls frequently consist of uncovered metal insensitive to atmospheric influences. For example, with the use of stainless steel, corrosion damages are far-reachingly prevented; however, price and weight savings, by the elimination of the application of a protective layer, become effective in a decisive manner.

In order to avoid expensive material thicknesses and nevertheless to enliven optically the surface of the outer body panels and to achieve a sufficient rigidity, a profiled paneling is preferred. Hollow spaces extend underneath the profiled projections of a wave-shaped or trapezoidally shaped profiled outer body, which hollow spaces are laid bare at the apertures of the wall, such as doors, luggage space or engine space and possibly also windows. A flanging over or a beveling or chamfering which may be realized for achieving a covering, is both time-consuming and expensive. Additionally, the gaps remaining nevertheless continue to be harmful whereas a welding entails the danger of distortions and for the most part is connected with high costs, if realizable at all.

Summary of the invention

To eliminate the aforementioned drawbacks, it is proposed in accordance with the present invention that an angularly shaped cover strip covers the end-face edge of the paneling by means of the leg portion thereof extending transversely to the plane of the paneling while the other leg portion encloses an elastic filler strip slightly covering the raised portions of the paneling and completely filling the recesses thereof, and that the hollow spaces underneath the raised portions are completely filled within the area of the strip with elastic stoppers or plugs.

Accordingly, it is an object of the present invention to provide a cover arrangement for the outer panels of large space vehicles, especially buses, which avoids the aforementioned shortcomings and drawbacks encountered with the prior art constructions in a completely satisfactory manner and at the same time assures a covering of the exposed edges which is completely unobjectionable from an optical point of view.

Another object of the present invention resides in a cover arrangement for the outer paneling of large space vehicles which prevents injury to persons, damage to equipment, and protects the hollow spaces against penetration, moisture, water, gases, dust or other foreign particles in a reliable, yet inexpensive manner.

A further object of the present invention resides in a cover arrangement for outer body panels of sectional contour which entails considerable savings in cost and weight by the elimination of costly, protective stainless steel layers.

Still another object of the present invention resides in a cover arrangement for the outer panels of buses which not only enlivens optically the outer body panels and also assures a sufficient rigidity thereof but avoids cumbersome and expensive operations that may entail difficulties and stresses in the finished product.

These and further objects, features, and advantages of the present invention will become more obvious from the following description when taken in connection with the accompanying drawing, which shows, for purposes of illustration only, one embodiment in accordance with the present invention, and wherein:

FIGURE 1 is a partial side elevational view of a bus having a profiled paneling and cover arrangement in accordance with the present invention;

FIGURE 2 is a top plan view, partially in cross section and on an enlarged scale, of a cover arrangement in accordance with the present invention as viewed from above within the area of a door column;

FIGURE 3 is a cross-sectional view, taken along line III—III of FIGURE 1; and

FIGURE 4 is a cross-sectional view, on an enlarged scale, taken along line IV—IV of FIGURE 1.

Referring now to the drawing wherein like reference numerals are used throughout the various views to designate like parts, the bus generally designated by reference numeral 5 (FIG. 1) includes a side wall which is provided with a profiled, multigrooved outer steel paneling 6 having grooves 7 of approximately trapezoidally shaped cross section (FIG. 3). The area of the grooves 7 begins in proximity of the window ledge and extends almost to the lower end of the side wall.

The paneling 6 is provided with several apertures 8 for doors, luggage spaces or the like. At the edges of these apertures 8, the hollow spaces 9 located underneath the raised portions 15 of the sheet metal paneling 6 are open in the direction toward the apertures 8. In order to prevent the penetration of water, dust, or other foreign particles, at these places, filler strips 10 and plugs 23 of elastically yielding, temperature- and oil-insensitive and water-proof synthetic plastic materials of any conventional type are provided.

The filler strip 10 is enclosed by a sheet metal cover strip 11 which is secured (FIG. 2) at a frame part of the vehicle body, for example, at a column 13. The cover strip 11 is constructed so wide that it covers with certainty the connecting places 14 of the paneling 6 with the column 13. For reasons of cost saving, the strip 10 may also consist of individual pieces which are placed tightly against one another at the separating places 10a (FIG. 3).

The filler strip 10 extends outwardly beyond and over the raised portions 15. The filler strip 10 is pressed by means of the cover strip 11 consisting of two leg portions 17 and 18 and secured at the column 13, against the bottom 16 and the raised portions 15 of the profiled paneling 6. The leg portion 18 of cover strip 11 is securely riveted to the inwardly extending wall 19 of the column 13. Appropriately blind rivets are used for that purpose.

At the transition places 20 of the profiled wall section into the smooth section 21 of the paneling, the portion of the filler strip 10 covering the raised portion 15 terminates with an inclined surface in the direction of the side 22 of the last raised portion 15 leading to the groove bottom 16. The leg portion 17 of the cover strip 11 is bent over in the same sense as indicated by reference numeral 17′ in FIGURE 4.

The plugs or stoppers 23 consist of the same synthetic plastic material, for example, resinous material, as the strip 10 and have the shape of the hollow spaces 9 below the raised portions 15, appropriately though of slightly larger dimensions.

Of course, both the strip 10 as well as the plugs 23 may be glued into the panels or molded into the same in order to achieve a particularly effective seal.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A cover arrangement for the exposed edges of a profiled outer body paneling of large-space vehicles, especially buses, comprising filler strip means slightly covering the raised portions of the paneling and completely filling the recesses thereof, elastic plug means filling the hollow spaces underneath the raised portions of the paneling within the area of the filler strip means, and angularly shaped cover strip means having one leg portion extending substantially transversely to the plane of the paneling, said one leg portion covering the exposed edge of the paneling, and the other leg portion of said cover strip means embracing the filling strip means.

2. A cover arrangement according to claim 1, wherein said other leg portion, which extends approximately parallel to the plane of the paneling, is slightly curved toward the paneling.

3. A cover arrangement according to claim 2, wherein said one leg portion is secured at a vehicle frame part.

4. A cover arrangement according to claim 3, further comprising blind rivets for securing said one leg portion at said vehicle frame part.

5. A cover arrangement according to claim 3, wherein said other leg portion is bent at the transition from the profiled section of the paneling to the smooth section thereof in the direction toward the latter.

6. A cover arrangement according to claim 5, wherein the terminal portion of the other leg portion is bent flush with the corresponding inclined surface of the last raised portion of the profiled paneling.

7. A cover arrangement according to claim 6, wherein said filler strip means and said plug means essentially consist of oil- and water-tight, temperature-resistant and elastically yielding synthetic plastic material.

8. A cover arrangement according to claim 1, wherein said one leg portion is secured at a vehicle frame part.

9. A cover arrangement according to claim 1, wherein said other leg portion is bent at the transition from the profiled section of the paneling to the smooth section thereof in the direction toward the latter.

10. A cover arrangement according to claim 9, wherein the terminal portion of the other leg portion is bent flush with the corresponding inclined surface of the last raised portion of the profiled paneling.

11. A cover arrangement according to claim 1, wherein said filler strip means and said plug means essentially consist of oil- and water-tight, temperature-resistant and elastically yielding synthetic plastic material.

References Cited

UNITED STATES PATENTS 3,266,192  8/1966  Kolm _____ 49—397

BENJAMIN HERSH, *Primary Examiner.*

L. D. MORRIS, Jr., *Assistant Examiner.*